(12) United States Patent
Ueki et al.

(10) Patent No.: US 7,032,461 B2
(45) Date of Patent: Apr. 25, 2006

(54) FLOW SENSOR HAVING A FLOW INDICATOR HAVING A PLURALITY OF LIGHT EMISSION SECTIONS

(75) Inventors: Kengo Ueki, Osaka (JP); Kazutoshi Sugiyama, Osaka (JP); Koji Fukumura, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 10/849,520

(22) Filed: May 20, 2004

(65) Prior Publication Data

US 2004/0255690 A1    Dec. 23, 2004

(30) Foreign Application Priority Data

May 20, 2003    (JP)    ............... P. 2003-141917

(51) Int. Cl.
*G01F 1/32* (2006.01)

(52) U.S. Cl. .................... 73/861.22; 73/861.25
(58) Field of Classification Search ............ 73/861.21, 73/861.22, 861.23, 861.25, 861.19
See application file for complete search history.

(56) References Cited

U.S. PATENT DOCUMENTS

| | | | | |
|---|---|---|---|---|
| 3,680,375 | A | * | 8/1972 | Joy et al. .................. 73/861.23 |
| 3,788,141 | A | * | 1/1974 | Blackwell ................. 73/861.23 |
| 5,728,947 | A | * | 3/1998 | Marsh et al. ............. 73/861.23 |
| 5,747,701 | A | * | 5/1998 | Marsh et al. ............. 73/861.23 |
| 5,814,735 | A | * | 9/1998 | Kurisaki et al. ......... 73/861.22 |

FOREIGN PATENT DOCUMENTS

| | | |
|---|---|---|
| DE | 30 00 588 A | 7/1981 |
| EP | 0 099 712 A | 2/1984 |
| EP | 0 813 041 A | 12/1997 |
| EP | 1 118 841 A | 7/2001 |
| JP | 4-77620 A | 3/1992 |
| JP | 8-271300 A | 10/1996 |
| JP | 8-304142 A | 11/1996 |
| JP | 2798797 B | 7/1998 |
| JP | 2002-267509 A | 9/2002 |

* cited by examiner

*Primary Examiner*—Harshad Patel
(74) *Attorney, Agent, or Firm*—Smith Patent Office

(57) ABSTRACT

A flow sensor comprises a detection section and a main unit section. The detection section comprises a casing, a through water pipe line, a transmitter which transmits an ultrasonic wave, a receiver which receives the ultrasonic wave from the transmitter, and a flow indicator having light emission sections. The main unit section comprises a display section for displaying the flow quantity value. The casing and the through water pipe line have a width perpendicular to the longitudinal direction of the through water pipe line, and the width of the casing is approximately equal to the width of the through water pipe line. One of the faces of the casing consists of the light emitting sections and a planar face whereby the width of the casing can be minimized. The detection section further comprises an alarm detector and a compute unit performs different processing when the alarm signal is on.

20 Claims, 13 Drawing Sheets

Prior Art

FLOW SENSOR HAVING A FLOW INDICATOR HAVING A PLURALITY OF LIGHT EMISSION SECTIONS

BACKGROUND OF THE INVENTION

1. Field of the Invention

This invention relates to a flow sensor for detecting the flow quantity of a fluid.

2. Description of the Related Art

Previously, various flow sensors have been used for detecting the flow quantity of a fluid. For example, an ultrasonic vortex flow sensor ultrasonically detects a flow quantity change in a noncontact manner. A Karman vortex regularly occurs downstream from a vertex generation pole placed in a flow. The ultrasonic vortex flow sensor can ultrasonically detect a change in the Karman vortex, and can thereby detect the flow quantity with a high accuracy over a wide flow quantity range. (For example, refer to JP-A-4-77620 and JP-A-8-304142)

Such flow sensors include an integral-type flow sensor and a separate flow sensor. The integral-type flow sensor, which has a flow quantity detection part and a flow quantity display part in one piece, becomes larger. On the other hand, the separate flow sensor is provided in a detection section for detecting the flow quantity. A display section displays the value of the detected flow quantity. Generally, in the separate flow sensor, the detection section does not have a display section and thus can be miniaturized.

However, by installing the detection section, the user cannot check whether or not the flow quantity exists and whether or not the flow sensor processes normally.

FIG. 13 is an external perspective view of the detection section of the flow sensor in the related art, and FIG. 14 is an exploded perspective view of the detection section of the flow sensor in the related art.

As shown in FIG. 13, a detection section 900 has a casing 940 shaped like a rectangular parallelepiped and is provided with a through water pipe line 910 so as to pierce opposed sides of the casing 940. A circuit board 950 is placed above the through water pipe line 910.

As shown in FIG. 14, a cylindrical element storage part 920 is provided on both sides of the outer peripheral surface of the through water pipe line 910, and a transmitter 911 and a receiver 912 are inserted into the element storage parts 920. Each element storage part 920 is closed by a press member 930 having a convex part 9a in the central portion. Accordingly, the convex parts 9a of the press members 930 press the transmitter 911 and the receiver 912 against the outer peripheral surface of the through water pipe line 910. A taking-out pipe 970 of a conductor KB of the transmitter 911 and the receiver 912 of the through water pipe line 910 is provided in the direction crossing the element storage parts 920. Thus, the press members 930 each having the convex part 9a centrally press the transmitter 911 and the receiver 912 against the outer peripheral surface of the through water pipe line 910. In this case, the size of the detection section 900 of the flow sensor in the related art becomes larger in the direction in which the transmitter 911 and the receiver 912 are aligned. Also, the size of the detection section 900 of the flow sensor becomes larger in the direction crossing the direction in which the transmitter 911 and the receiver 912 are aligned. Since such a structure is housed in the casing 940, the detection section 900 is upsized as a whole. Recently, it has been desired to make the detection section 900 smaller.

SUMMARY OF THE INVENTION

It is an object of the invention to provide a flow sensor for enabling the user to easily check the detection state of the flow quantity in a detection section.

It is another object of the invention to provide a flow sensor for enabling the user to easily check the detection state of the flow quantity in a detection section that can be miniaturized and made smaller.

According to the invention, there is provided a flow sensor including a detection section for detecting a flow quantity of a fluid, the detection section having a display section for displaying information based on the detected flow quantity; and a main unit section being provided as a separate body from the detection section for displaying the flow quantity detected by the detection section.

In the flow sensor according to the invention, the detection section detects the flow quantity of a fluid. The detected flow quantity is displayed on the main unit section provided as a separate body from the detection section. The information based on the detected flow quantity is displayed on the display section of the detection section.

In this case, the detection section is provided with the display section for displaying the information based on the flow quantity, thus enabling the user to easily check the detection state of the flow quantity on the detection section.

The display section may includes a plurality of light emission sections; and a control section for turning on the plurality of light emission sections in order at speed responsive to the detected flow quantity.

In this case, the plurality of light emission sections are turned on in order at the speed responsive to the detected flow quantity, so that the user can easily recognize the flow of the fluid from a distance. The display section can be miniaturized and the detection section can also be miniaturized.

The detection section may further includes a Karman vortex detection section for ultrasonically detecting change in a Karman vortex of a fluid; and a pulse signal generation section for generating a pulse signal corresponding to the change in the Karman vortex detected by the Karman vortex detection section, and the control section may turn on the plurality of light emission sections in order based on the pulse signal generated by the pulse signal generation section.

In this case, change in a Karman vortex of a fluid is ultrasonically detected and a pulse signal corresponding to the detected change in the Karman vortex is generated. The plurality of light emission sections are tuned on in order based on the pulse signal.

Accordingly, the plurality of light emission sections are turned on in order at the speed corresponding to the flow quantity of the fluid, so that the user can visually recognize the flow of the fluid from a distance.

The display section may display a level responsive to the detected flow quantity. In this case, since the level responsive to the detected flow quantity is displayed, the user can visually recognize the flow of the fluid from a distance.

The detection section may include a pipe line through which a fluid passes; a vortex generation member being provided in the pipe line for generating a Karman vortex; a pair of ultrasonic devices being placed on an outer peripheral surface of the pipe line so as to be opposed to each other with the pipe line between; and a press member having a pair of press parts for pressing the pair of ultrasonic devices against the pipe line and a joint part for joining the pair of press parts.

In this case, the pair of ultrasonic devices is placed on the outer peripheral surface of the pipe line so as to be opposed to each other with the pipe line between, and is pressed against the pipe line by the pair of press parts joined by the joint part of the press member.

The detection section may include a casing having a width of a first length and a thickness of a second length smaller than the first length, and the pair of ultrasonic devices may be placed in the casing so as to be arranged in a width direction.

In this case, the pair of ultrasonic devices is provided in the casing so as to be arranged in the width direction, so that the detection section can be miniaturized and made slim.

The case may include a housing space for housing a circuit board connected to the display section provided so as to be adjacent to one of the ultrasonic devices in the width direction.

In this case, the housing space for housing the circuit board is provided so as to be adjacent to one of the ultrasonic devices in the width direction in the casing, so that the detection section can be miniaturized and made slim.

The case may include a hermetic seal space for hermetically sealing the pair of ultrasonic devices and a part of the pipe line. In this case, the hermetic seal space for hermetically sealing the pair of ultrasonic devices and a part of the pipe line is provided in the casing, so that the pair of ultrasonic devices and a part of the pipe line can be prevented from being contaminated by dust.

The housing space and the hermetic seal space may be put into one piece. In this case, the housing space and the hermetic seal space are put into one piece, whereby the pair of ultrasonic devices, a part of the pipe line, and the circuit board can be prevented from being contaminated by dust.

DETAILED DESCRIPTION OF THE INVENTION

Referring now to the accompanying drawings (FIGS. 1 to 12), flow sensors are shown according to first and second embodiments of the invention.

FIRST EMBODIMENT

Figure 1:
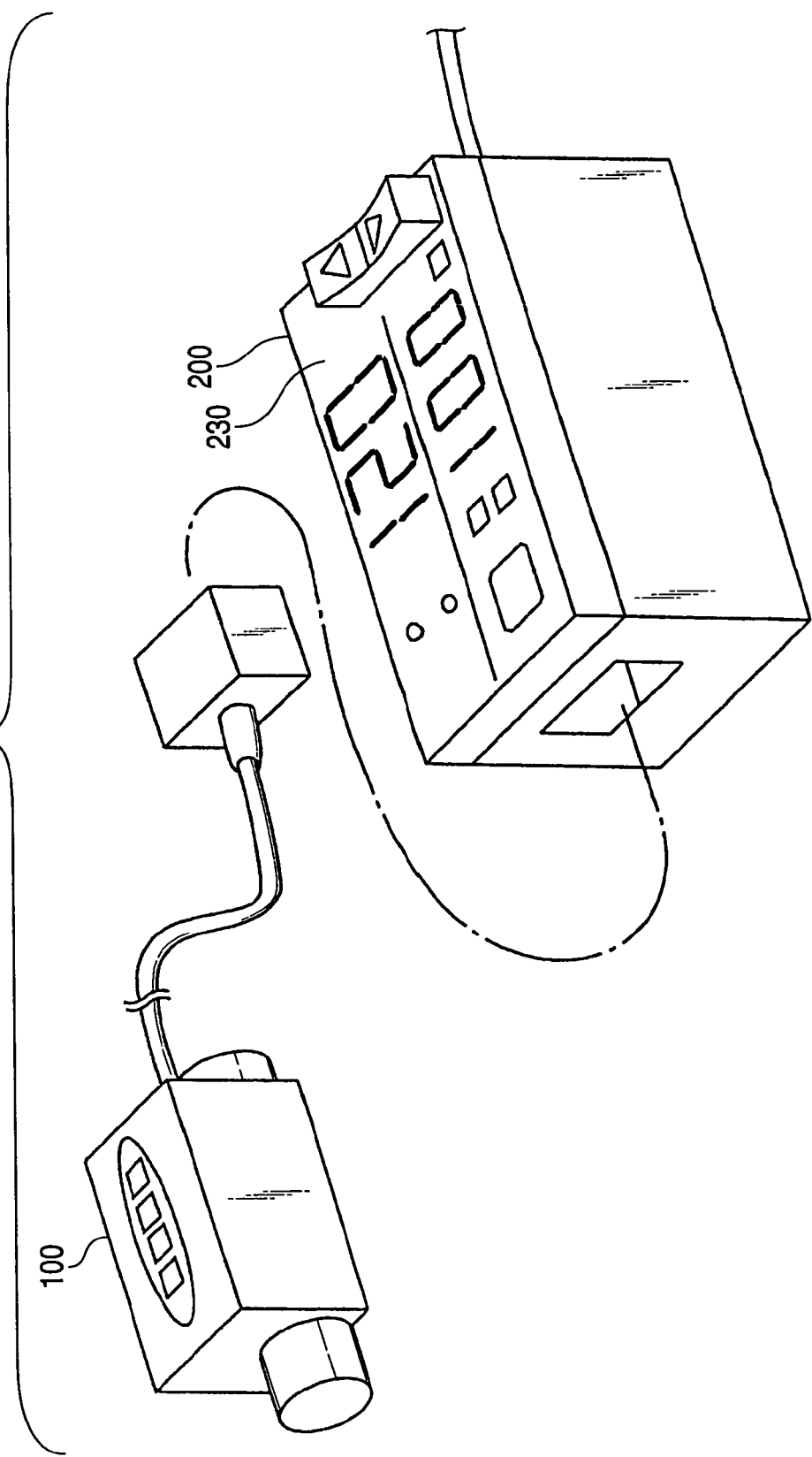
FIG. 1 is a schematic drawing to show the configuration of a flow sensor according to a first embodiment of the invention.

FIG. 1 is a schematic drawing to show the configuration of a flow sensor according to a first embodiment of the invention.

In FIG. 1, the flow sensor is provided in a detection section (sensor head or sensor head section) 100 and a main unit section (sensor main unit section or sensor main section) 200. The detection section 100 is connected to the main unit section 200 by a cable. The main unit section 200 has a display section 230.

Figure 2:
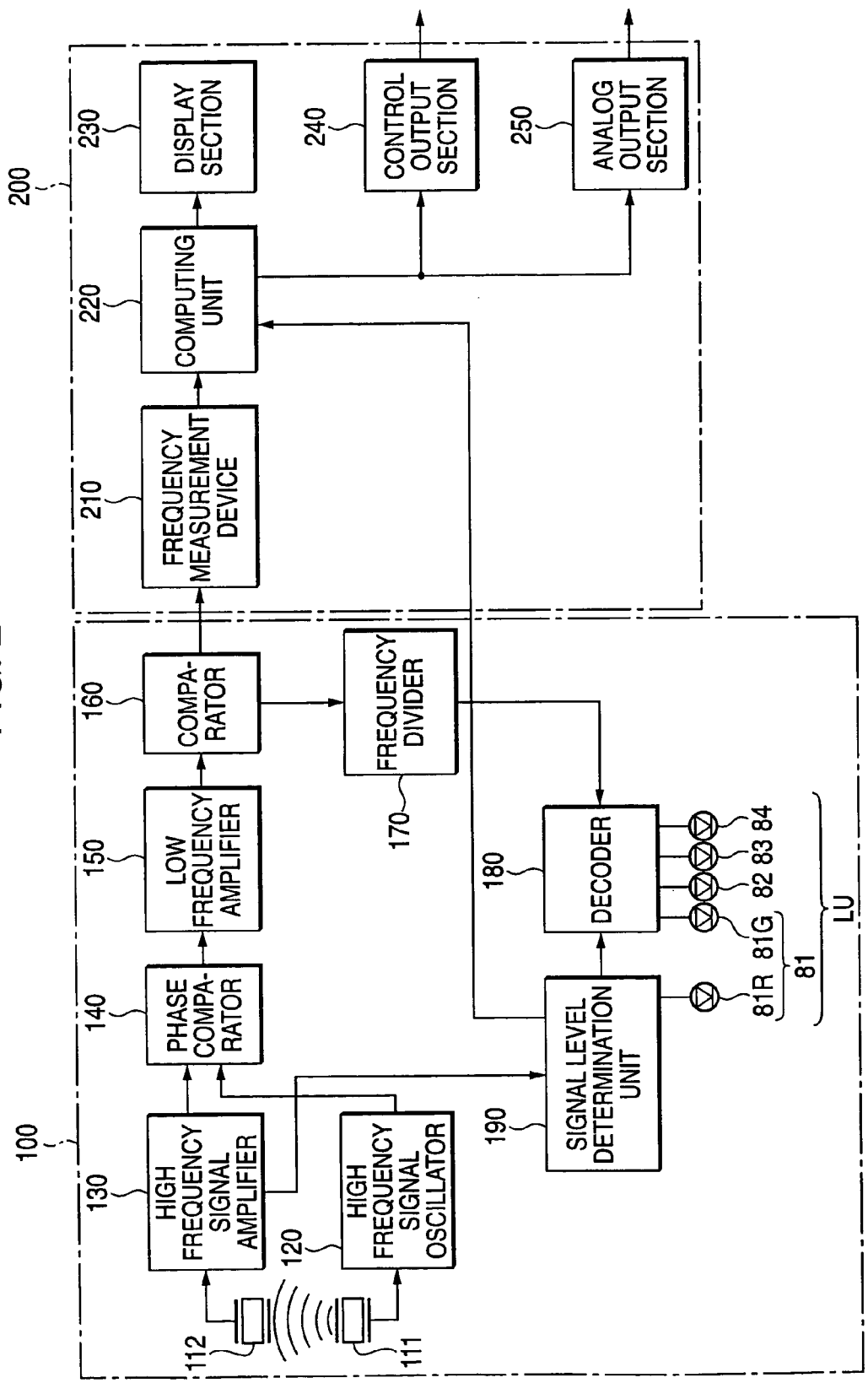
FIG. 2 is a block diagram to show the configuration of the flow sensor according to the first embodiment of the invention.

FIG. 2 is a block diagram to show the configuration of the flow sensor according to the first embodiment of the invention. As shown in FIG. 2, the flow sensor is provided in the detection section 100 and the main unit section 200.

The detection section 100 includes a transmitter 111, a receiver 112, a high frequency signal oscillator 120, a high frequency signal amplifier 130, a phase comparator 140, a low frequency amplifier 150, a comparator 160, a frequency divider 170, a decoder 180, a signal level determination unit 190, and a flow indicator LU. This flow indicator LU includes light emission sections 81 to 84. The light emission section 81 has a red LED (light emitting diode) 81R and a green LED 81G. Each of the light emission sections 82 to 84 has a green LED. For example, the transmitter 111 and the receiver 112 are implemented as ultrasonic devices.

The main unit section 200 includes a frequency measurement device 210, a computing unit 220, a display section 230, a control output section 240, and an analog output section 250. For example, the frequency measurement device 210 and the computing unit 220 are implemented as a CPU (central processing unit).

The high frequency signal oscillator 120 generates a high frequency signal and gives the high frequency signal to the transmitter 111, which then transmits an ultrasonic wave. The receiver 112 receives the ultrasonic wave from the transmitter 111. In this case, the frequency of a Karman vortex occurring on a fluid changes due to the flow quantity of the fluid. The ultrasonic wave propagation time changes in proportion to the frequency of the Karman vortex. Therefore, change in the ultrasonic wave propagation time from the transmitter 111 to the receiver 112 is detected, whereby the flow quantity can be detected.

The high frequency signal amplifier 130 amplifies an output signal of the receiver 112. The phase comparator 140 makes a phase comparison between the high frequency signal generated by the high frequency signal oscillator 120 and the output signal of the high frequency signal amplifier 130 and outputs a voltage corresponding to the phase difference. The low frequency amplifier 150 amplifies the output voltage of the phase comparator 140.

The comparator 160 compares the output signal of the low frequency amplifier 150 with a reference voltage and outputs a pulse indicating the comparison result. The frequency divider 170 divides the pulse output from the comparator 160. The decoder 180, which is implemented as a shift register, decodes the output signal of the frequency divider 170, thereby turning on the light emission sections 81 to 84 of the flow indicator LU in green in order. In this case, the speed at which the light emission sections 81 to 84 of the flow indicator LU are turned on in order changes in response to the flow quantity. The state in which the light emission sections 81 to 84 of the flow indicator LU are turned on is described later in detail.

The signal level determination unit 190 determines whether or not the level of the output signal of the high frequency signal amplifier 130 falls below a predetermined value. If the level of the output signal falls below the predetermined value, the signal level determination unit 190 turns on the red LED 81R of the light emission section 81 and prohibits the decoder 180 from turning on the green LED 81G of the light emission section 81 and the light emission sections 82 to 84 and further gives an alarm signal to the computing unit 220. Accordingly, the computing unit 220 can recognize that the reception level falls. If the through water pipe line 10 through which a fluid flows is not filled with a fluid or if a bubble exists in a fluid, the reception level of the receiver 112 falls and the accurate flow quantity value cannot be detected. In this case, the signal level determination unit 190 outputs an alarm signal.

If the signal level determination unit 190 gives an alarm signal to the computing unit 220, the computing unit 220 controls the display section 230, the control output section 240, and the analog output section 250 based on the given alarm signal.

If the given alarm signal is on (for example, high), the computing unit 220 causes the display section 230 to display an alarm and performs processing with a digital filter. For example, if the alarm signal is on, the computing unit 220 causes the display section 230 to display the flow quantity value applied before the alarm signal is turned on as many times as the preset number of times. The computing unit 220 also calculates moving average of the flow quantity values as many times as the preset number of times and causes the display section 230 to display the moving average. If the alarm signal is on, the control output section 240 turns on or off first output and second output using the flow quantity value applied before the alarm signal is turned on as many times as the preset number of times. The control output section 240 also turns on or off first output and second output based on the moving average of the flow quantity values as many times as the preset number of times. Further, the analog output section 250 outputs an analog alarm signal.

Thus, if the alarm signal is on, the computing unit 220 performs different processing from that if the alarm signal is off (for example, low), thereby performing processing based on the flow quantity value close to the accurate flow quantity value. Accordingly, processing based on an erroneous flow quantity value when the alarm signal is on can be prevented from being performed without decreasing the response speed when the alarm signal is off (in the normal mode).

The frequency measurement device 210 measures the frequency of the pulse output from the comparator 160. The computing unit 220 converts the frequency measured by the frequency measurement device 210 into a flow quantity and controls the display section 230, the control output section 240, and the analog output section 250 based on the flow quantity value.

The control output section 240 turns on or off first output and second output based on the flow quantity value. The analog output section 250 outputs an analog signal indicating the flow quantity value.

Figure 3A:
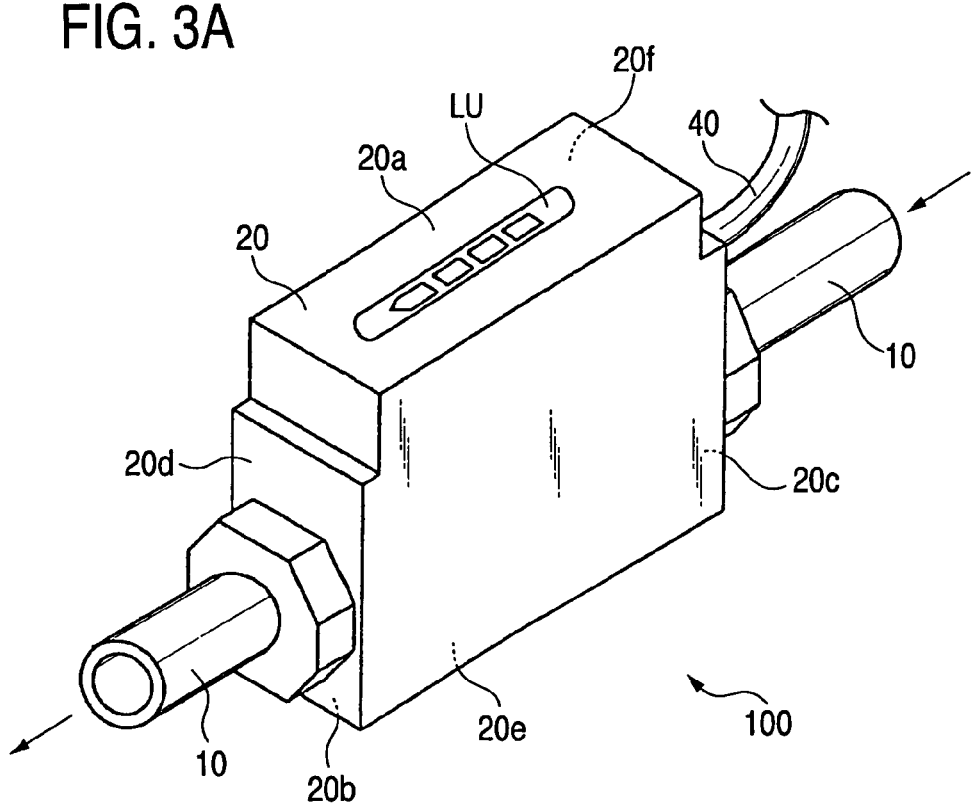
FIGS. 3A and 3B are external perspective views of a detection section of the flow sensor according to the first embodiment of the invention.
Figure 3B:
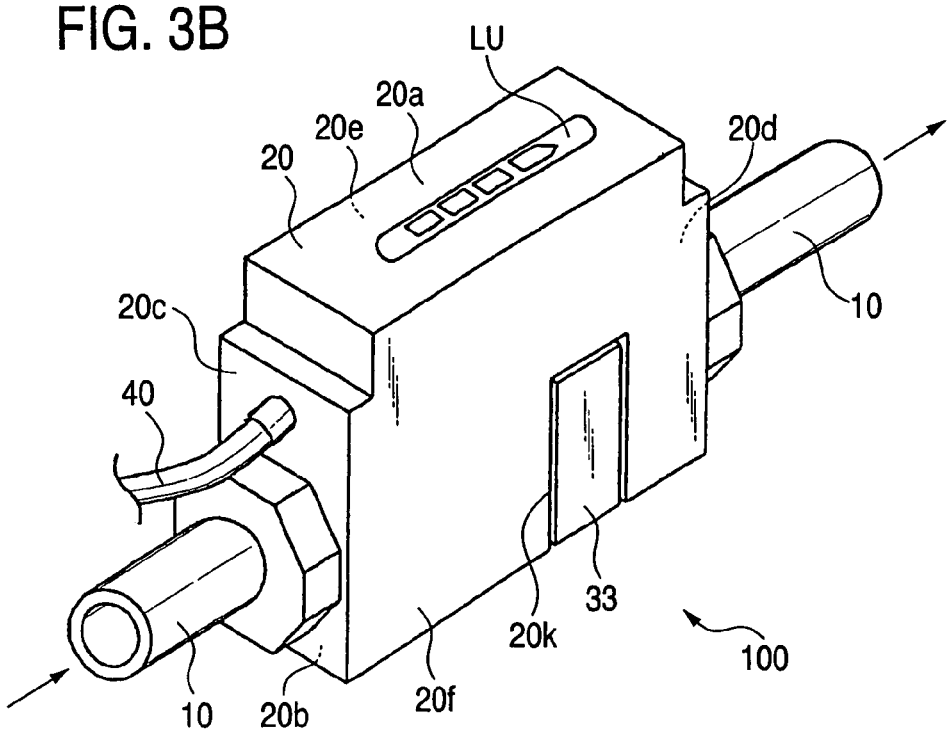

FIGS. 3A and 3B are external perspective views of the detection section of the flow sensor according to the first embodiment of the invention; FIG. 3A shows the detection section from one side and FIG. 3B shows the detection section from an opposite side.

In FIG. 3, the detection section 100 of the flow sensor includes a casing 20. The casing 20 has an upper face 20a, a lower face 20b, an end face 20c, an end face 20d, a side face 20e, and a side face 20f.

A through water pipe line 10 made of a resin such as resin fluoride is provided so as to pierce the end faces 20c and 20d of the casing 20. A fluid flows in the direction indicated by the arrow through the through water pipe line 10. A cable 40 for transmitting the detected flow quantity value to the main unit section 200 is connected to the end face 20c of the casing 20. Further, the above-described flow indicator LU is provided on the upper face 20a of the casing 20.

As shown in FIG. 3B, the casing 20 is formed on the side face 20f with a rectangular notch part 20K. In the notch part 20K, a lid 33 of a cabinet 30 integral with the through water pipe line 10 is flush with the side face 20f of the casing 20, forming a part of the casing 20.

Figure 4:
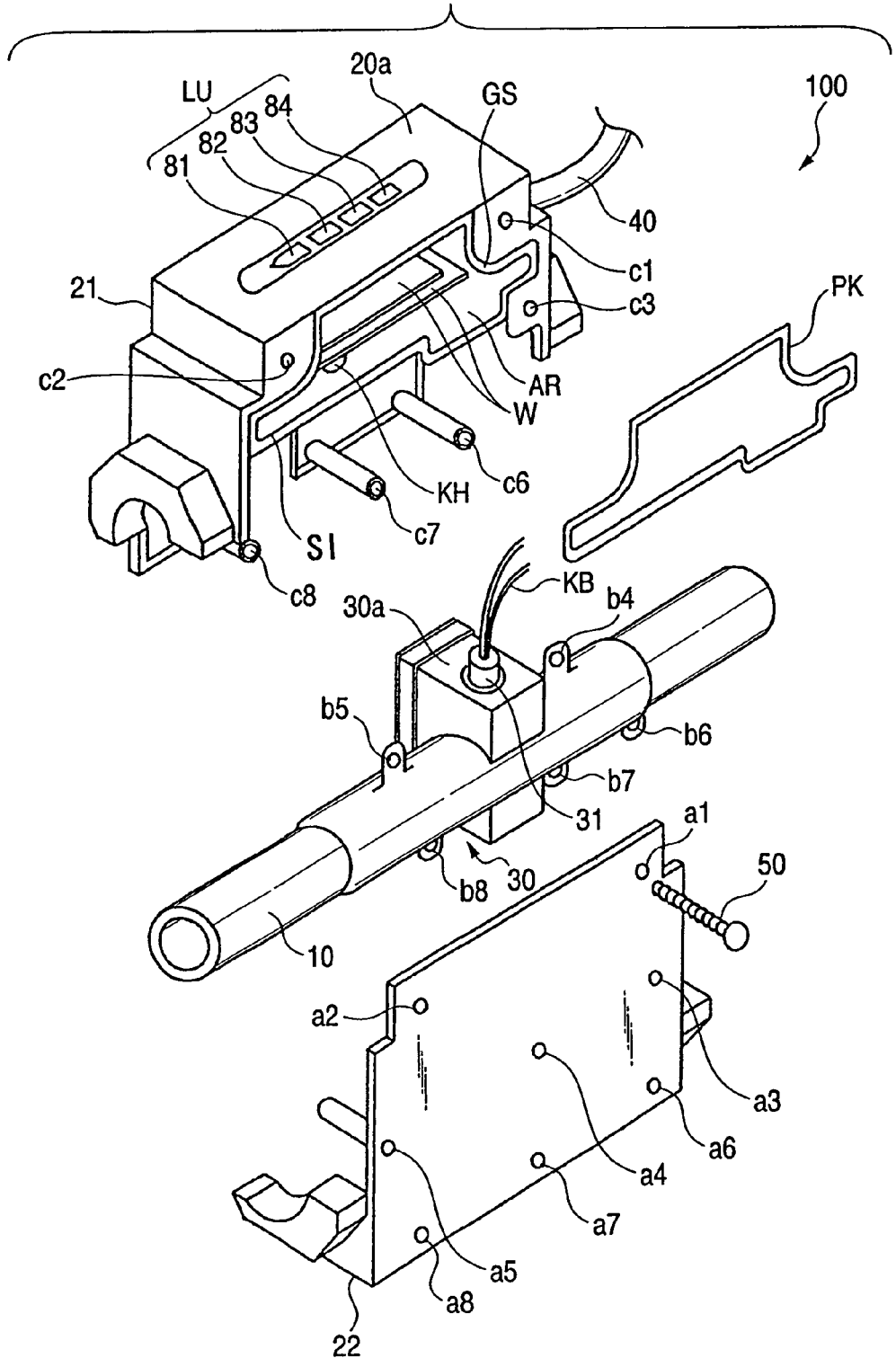
FIG. 4 is an exploded perspective view of the detection section of the flow sensor according to the first embodiment of the invention.
Figure 5A:
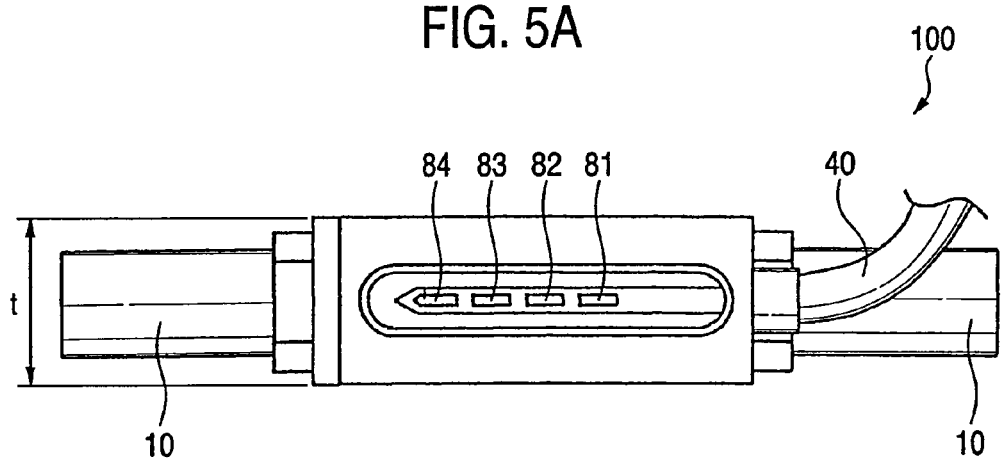
FIG. 5A is a plan view of the detection section of the flow sensor according to the first embodiment of the invention and FIG. 5B is an exploded side view of the detection section of the flow sensor according to the first embodiment of the invention.
Figure 5B:
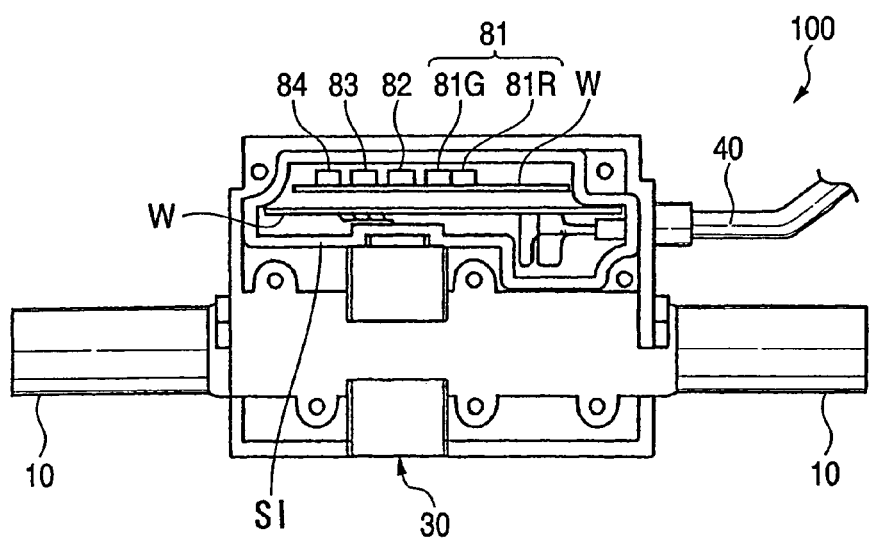

FIG. 4 is an exploded perspective view of the detection section of the flow sensor according to the first embodiment of the invention. FIG. 5A is a plan view of the detection section of the flow sensor according to the first embodiment of the invention and FIG. 5B is an exploded side view of the detection section of the flow sensor according to the first embodiment of the invention.

In FIG. 4, the detection section 100 is provided with casing members 21 and 22, the through water pipe line 10, two circuit boards W, packing PK, and a plurality of screws 50. The through water pipe line 10 is provided so as to pass through the cabinet 30 and is integral with the cabinet 30. The casing members 21 and 22 are combined into the casing 20 in FIG. 3.

The casing member 21 has a circuit housing area AR in an internal upper portion. The circuit housing area AR is surrounded by the upper face 20a of the casing member 21 and a partition plane SI. The two circuit boards W are installed so as to overlap each other in the circuit housing area AR.

Installed on the circuit boards W are the high frequency signal oscillator 120, the high frequency signal amplifier 130, the phase comparator 140, the low frequency amplifier 150, the comparator 160, the frequency divider 170, the decoder 180, the signal level determination unit 190, and the flow indicator LU described above.

Four holes are made in the upper face 20a of the casing member 21. The light emission sections 81 to 84 are placed on the circuit boards W in the circuit housing area AR corresponding to the four holes of the casing member 21.

To assemble the detection section 100, the through water pipe line 10 is attached to the inner lower side of the casing member 21. The cabinet 30 is integral with the through water pipe line 10 as described above and is fitted into the notch part 20K of the casing member 21 (see FIG. 3B).

A conductor taking-out part 31 is provided on an end face 30a of the cabinet 30. A conductor introduction hole KH is made in the partition plane SI of the casing member 21. To attach the cabinet 30 to the casing member 21, the conductor taking-out part 31 of the cabinet 30 is fitted into the conductor introduction hole KH. Accordingly, conductors of the transmitter 111 and the receiver 112 implemented as ultrasonic devices (described later) in the cabinet 30 are introduced through the conductor taking-out part 31 and the conductor introduction hole KH into the circuit boards W in the circuit housing area AR.

A seal member (not shown) is previously mounted on the conductor introduction hole KH. Therefore, the conductor taking-out part 31 and the conductor introduction hole KH are fitted into each other, whereby the inside of the cabinet 30 and the circuit housing area AR communicate with each other and become a hermetically sealed space.

As shown in FIG. 4, the casing member 21 to which the two circuit boards W and the through water pipe line 10 are attached is joined to the casing member 22 by the plurality of screws 50 via the packing PK on a seal face GS. The packing PK is mounted on the seal face GS, whereby the internal space of the circuit housing area AR is reliably hermetically sealed.

In FIG. 4, the casing members 21 and 22 are attached to each other by the plurality of screws 50 as follows: The screws 50 are screwed through threaded holes a1 to a8 of the casing member 22 into threaded holes c1 to c8 of the casing member 21, whereby the casing member 21 is attached to the casing member 22. The through water pipe line 10 is formed with screw introduction holes b4 to b8. To attach the casing members 21 and 22, the screws 50 passing through the threaded holes a4 to a8 of the casing member 22 pass through the screw introduction holes b4 to b8.

Thus, the casing members 21 and 22 are attached by the plurality of screws 50, whereby the casing 20 can be easily made waterproof.

In the embodiment, the casing members 21 and 22 may be attached not only by the plurality of screws 50, but also with an adhesive, etc.

The casing members 21 and 22 are attached as described above, whereby thickness t of the detection section 100 of the flow sensor in one direction of the detection section 100 is narrowed, as shown in FIG. 5A. The thickness t is, for example, 20.0 mm.

Figure 6:
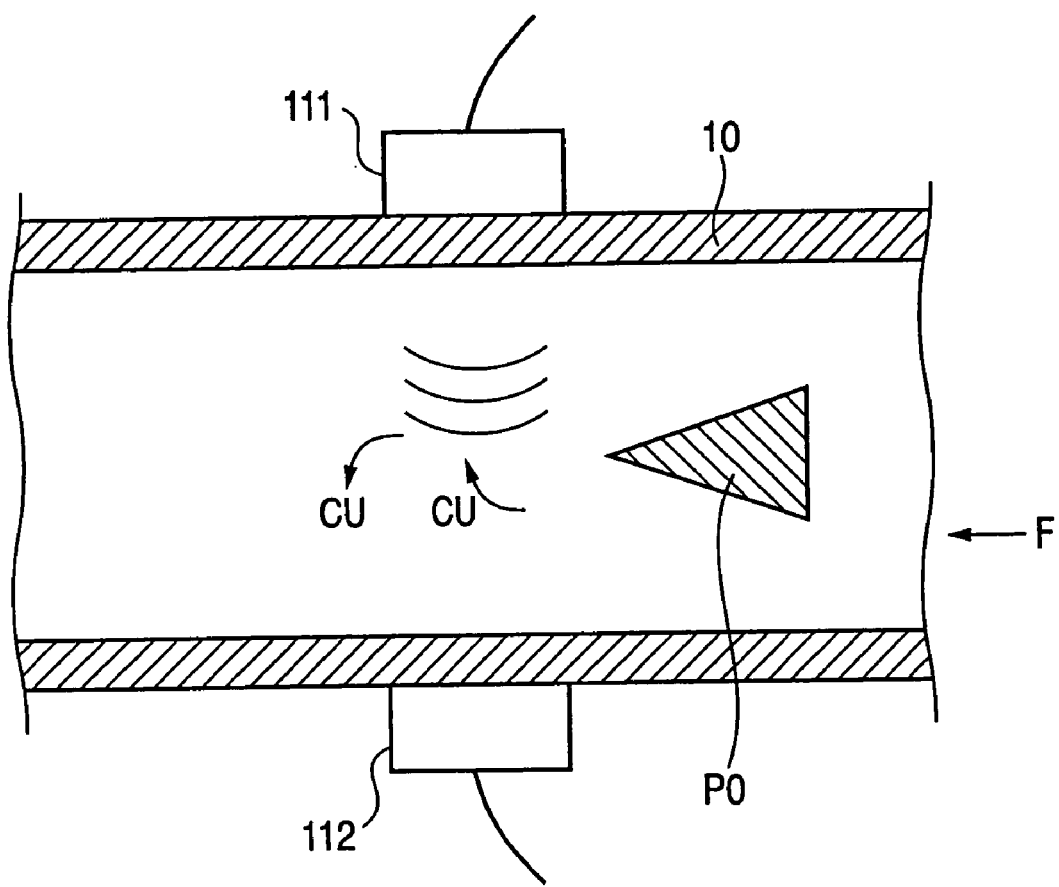
FIG. 6 is a schematic drawing to show the flow quantity measurement principle of the flow sensor according to the first embodiment of the invention.

The measurement principle of the flow quantity in the cabinet 30 will be discussed with FIG. 6. FIG. 6 is a schematic drawing to show the flow quantity measurement principle of the flow sensor according to the first embodiment of the invention. In FIG. 6, arrow F indicates a flow of fluid in the through water pipe line 10. A column PO for causing fluid to generate a Karman vortex is provided in the through water pipe line 10.

In the cabinet 30, the transmitter 111 is attached to the outer peripheral surface of the through water pipe line 10 downstream from the column PO in the through water pipe line 10, and the receiver 112 is attached to the outer peripheral surface of the through water pipe line 10 so as to be opposed to the transmitter 111.

To measure the flaw quantity of the fluid flowing through the through water pipe line 10, the transmitter 111 transmits an ultrasonic wave. In contrast, the receiver 112 opposed to the transmitter 111 with the through water pipe line 10 between receives the ultrasonic wave transmitted through the through water pipe line 10 and the inside of the through water pipe line 10.

The fluid flowing through the through water pipe line 10 generates a Karman vortex responsive to the flow quantity of the fluid in the presence of the column PO (arrows CU). Accordingly, the propagation time of the ultrasonic wave propagating in the fluid changes and therefore the flow quantity of the fluid flowing through the through water pipe line 10 is calculated based on the difference between the transmission point in time of the ultrasonic wave transmitted by the transmitter 111 and the reception point in time of the ultrasonic wave received by the receiver 112.

Figure 7:
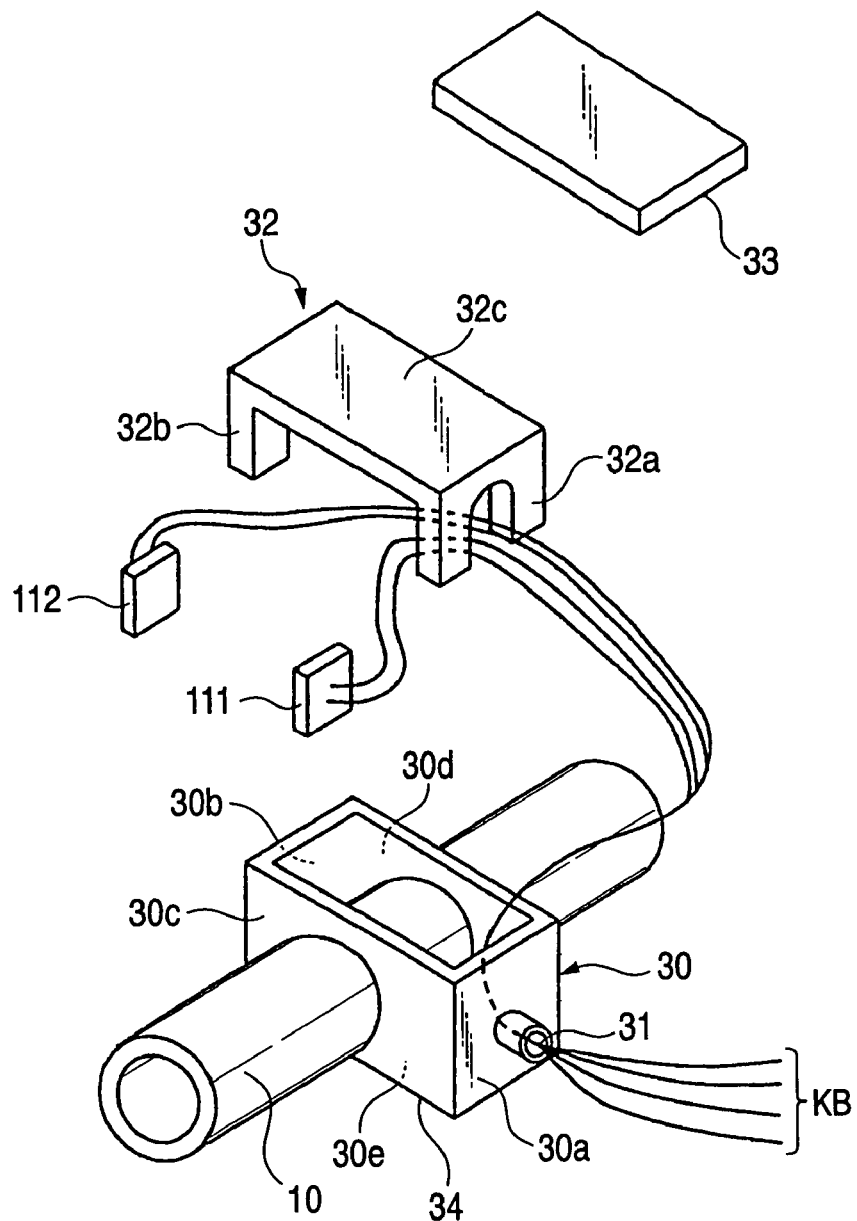
FIG. 7 is an exploded perspective view of a cabinet of the flow sensor according to the first embodiment of the invention.

The structure of the cabinet 30 will be discussed with FIG. 7. FIG. 7 is an exploded perspective view of the cabinet of the flow sensor according to the first embodiment of the invention.

In FIG. 7, the cabinet 30 has end faces 30a and 30b, side faces 30c and 30d, and a bottom face 30e. The through water pipe line 10 is provided so as to pierce the side faces 30c and 30d. In the cabinet 30, the transmitter 111 and the receiver 112 are attached to the outer peripheral surface of the through water pipe line 10 with the through water pipe line 10 between.

A press member 32 is provided with a pair of press parts 32a and 32b and a flat part 32c. The pair of press parts 32a and 32b is formed integrally with both ends of the flat part 32c angular U-shaped in cross section so as to be opposed to each other. The press part 32a is formed with a notch shaped like a letter U. The press parts 32a and 32b of the press member 32 are inserted between the transmitter 111 and the receiver 112 and the end faces 30a and 30b of the cabinet 30. Accordingly, the transmitter 111 and the receiver 112 are pressed against the outer peripheral surface of the through water pipe line 10 by the press parts 32a and 32b of the press member 32. Consequently, the transmitter 111 and the receiver 112 are fixed in the cabinet 30.

The conductors of the transmitter 111 and the receiver 112 are introduced through the notch of the press part 32a and the conductor taking-out part 31 of the cabinet 30 into the outside. In this state, the opening of the cabinet 30 is covered with the lid 33, so that the cabinet 30 can be hermetically sealed.

Subsequently, light emission patterns of the light emission sections 81 to 84 of the flow indicator LU will be discussed in detail with FIG. 8. FIGS. 8A to 8E are schematic drawings to describe the light emission patterns of the flow indicator of the flow sensor according to the first embodiment of the invention.

When the flow quantity in the through water pipe line 10 is measured, if the fluid in the through water pipe line 10 flows, the light emission sections 81 to 84 of the flow indicator LU blink in green in order.

Figure 8A:
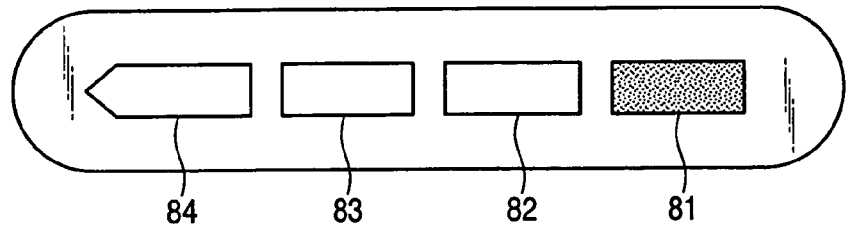
FIGS. 8A to 8E are schematic drawings to describe light emission patterns of a flow indicator of the flow sensor according to the first embodiment of the invention.
Figure 8B:
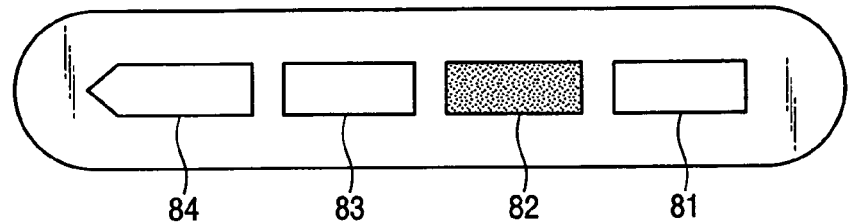
Figure 8C:
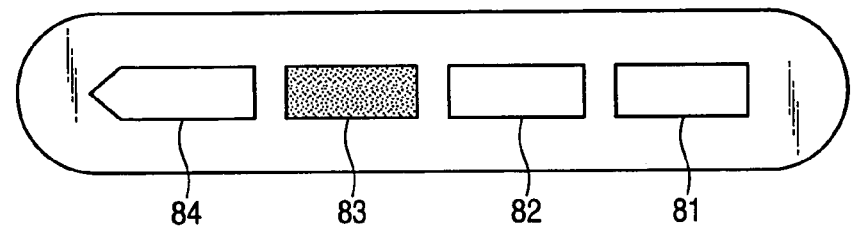
Figure 8D:
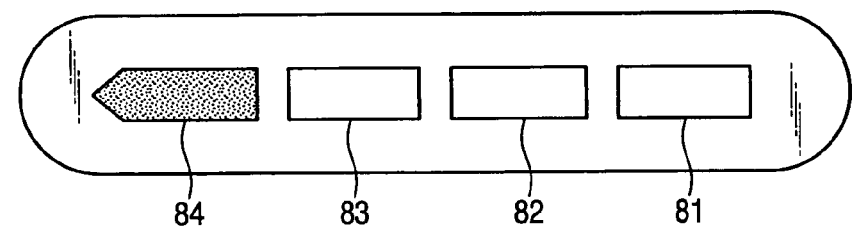

For example, first the green LED 81G of the light emission section 81 goes on in green as shown in FIG. 8A; next, the light emission section 81 goes off and the light emission section 82 goes on in green as shown in FIG. 8B; subsequently the light emission section 82 goes off and the light emission section 83 goes on in green as shown in FIG. 8C; and further the light emission section 83 goes off and the light emission section 84 goes on in green as shown in FIG. 8D. This operation is repeated in the order of FIG. 8A to FIG. 8D.

In this case, the light emission sections are turned on in order at the speed responsive to the detected flow quantity, so that the user can easily recognize the flow of the fluid from a distance. The display section can be miniaturized and the detection section can also be miniaturized.

Figure 8E:
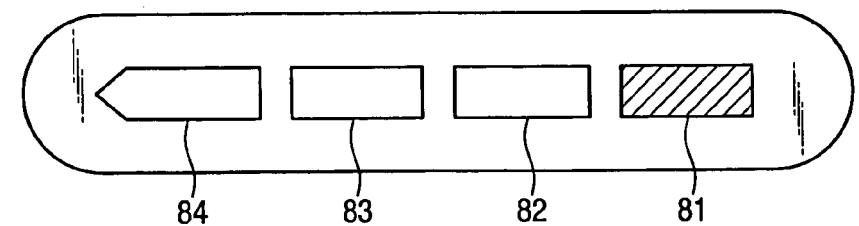

On the other hand, when the flow quantity in the through water pipe line 10 is measured, if there is no fluid in the through water pipe line 10 or if the fluid contains a large number of bubbles or the like, the light emission section 81 of the flow indicator LU goes on in red as shown in FIG. 8E.

Here, assume that the light emission sections 81 to 84 of the flow indicator LU blink in order in a specific direction (for example, forward). In the embodiment, the limit emission operation of the flow indicator LU is performed based on the frequency of a Karman vortex as described above; for example, the frequency of a Karman vortex occurring in a flow sensor having a ½-inch bore is about 600 Hz at the maximum. If the limit emission operation is performed based on the frequency, it is too fast for human eyes to recognize the forward mode clearly. Then, 600-Hz pulse is divided by six ½ frequency dividers, whereby 9.4-Hz pulse at the maximum can be provided. In this case, forward display is produced at natural speed for human eyes.

Thus, the frequency dividing ratio can be determined appropriately by the bore of the flow sensor. The frequency dividing method can be realized by a logical circuit or microcomputer software.

In the embodiment, the light emission sections 81 to 84 of the flow indicator LU need not necessarily go on in green in order. For example, the light emission sections 81 to 84 may produce level display of the detected flow quantity rather than going on in green in order. Specifically, as many light emission sections as the number responsive to the flow quantity are turned on.

Figure 9:
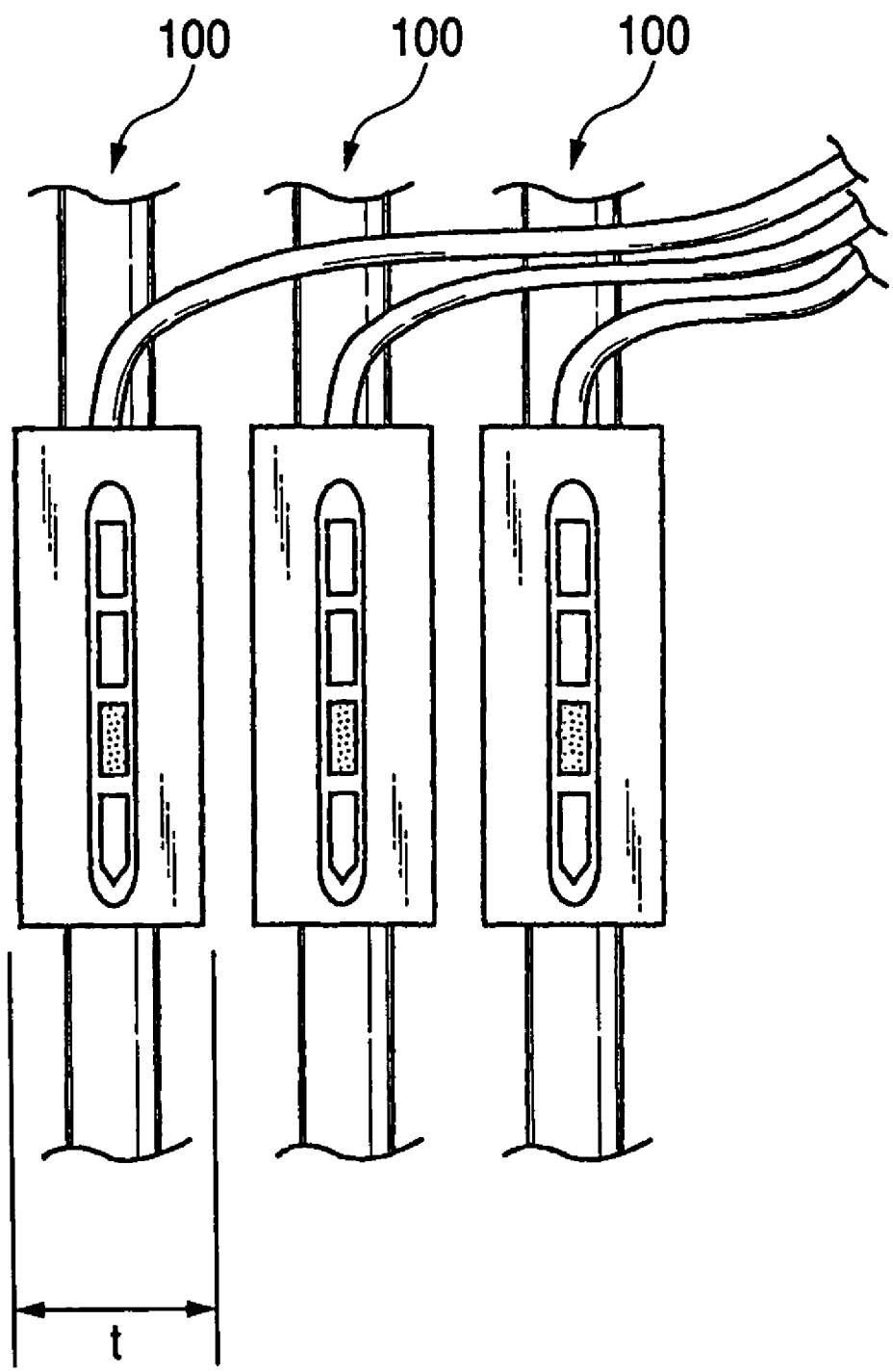
FIG. 9 is a drawing to show an application example of the detection sections of the flow sensor according to the first embodiment of the invention.

FIG. 9 is a drawing to show an application example of the detection sections of the flow sensor according to the first embodiment of the invention. The detection section of the flow sensor according to the embodiment has the small thick in the predetermined direction (t in FIG. 9) as shown in FIG. 5A, so that a plurality of detection sections 100 can be brought close into each other, as shown in FIG. 9.

The flow sensor according to the embodiment is formed of resin fluoride, etc. Therefore, the flow sensor is used suitably for a manufacturing line, etc., where fluid of chemicals, etc., flows. The flow sensor is also suited for measurement of the flow quantity of a fluid requiring cleanness.

SECOND EMBODIMENT

Figure 10:
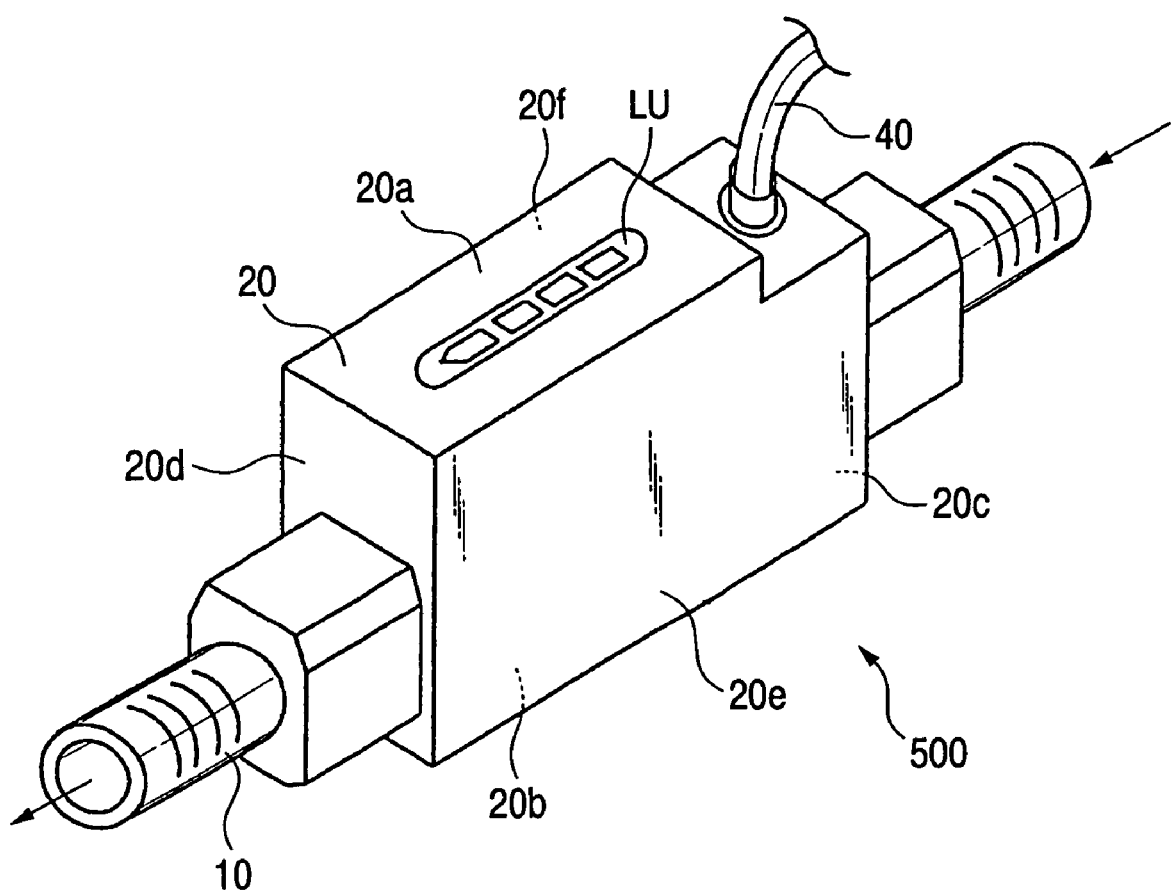
FIG. 10 is an external perspective view of a detection section of a flow sensor according to a second embodiment of the invention.

A flow sensor according to a second embodiment of the invention has a similar configuration and similar operation to those of the flow sensor according to the first embodiment except for the following points:

FIG. 10 is an external perspective view of a detection section of the flow sensor according to the second embodiment of the invention.

In FIG. 10, the detection section 500 of the flow sensor includes a casing 20. The casing 20 has an upper face 20a, a lower face 20b, an end face 20c, an end face 20d, a side face 20e, and a side face 20f.

A through water pipe line 10 molded of the same material as the casing 20 is projected from the end faces 20c and 20d of the casing 20. A fluid flows in the direction indicated by the arrow through the through water pipe line 10. A cable 40 for transmitting the detected flow quantity value to a main unit section 200 is connected to the rear end part of the casing 20. Further, a flow indicator LU similar to that in the first embodiment is provided on the upper face 20a of the casing 20.

Figure 11:
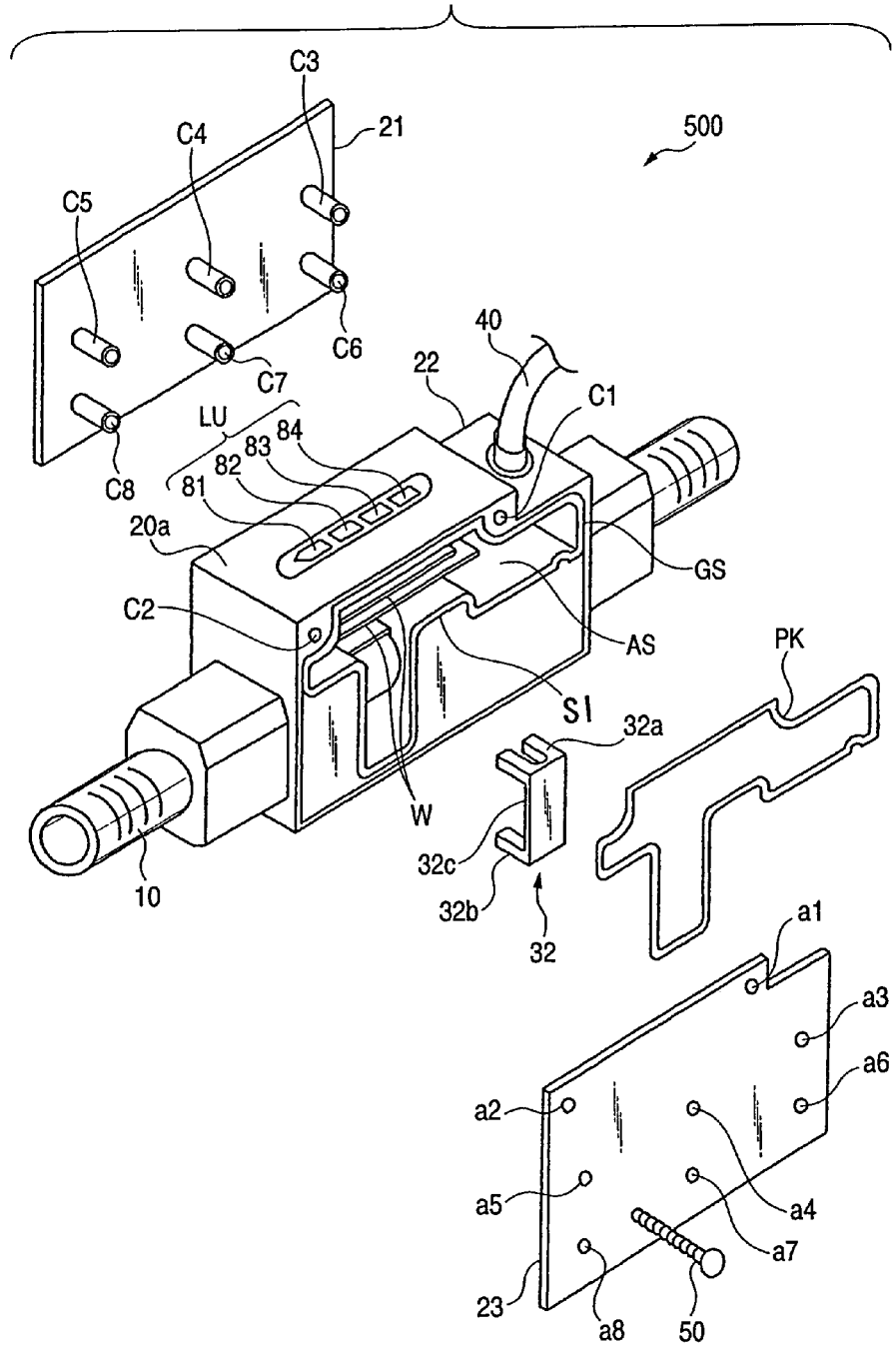
FIG. 11 is an exploded perspective view of the detection section of the flow sensor according to the second embodiment of the invention.
Figure 12A:
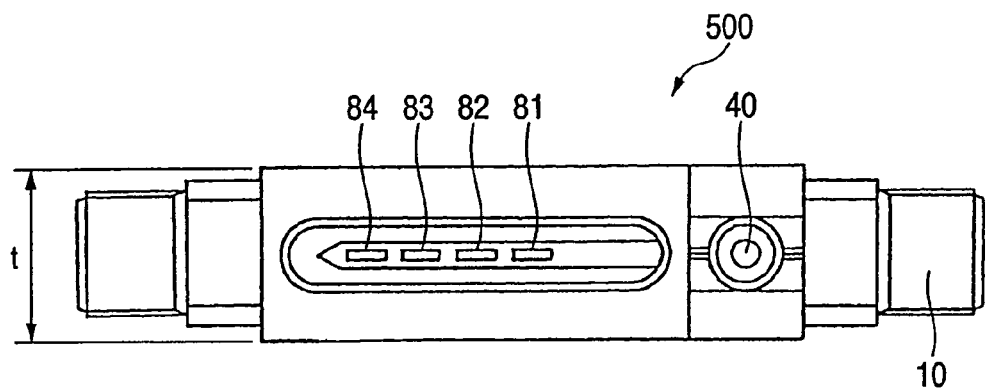
FIG. 12A is a plan view of the detection section of the flow sensor according to the second embodiment of the invention and FIG. 12B is an exploded side view of the detection section of the flow sensor according to the second embodiment of the invention.
Figure 12B:
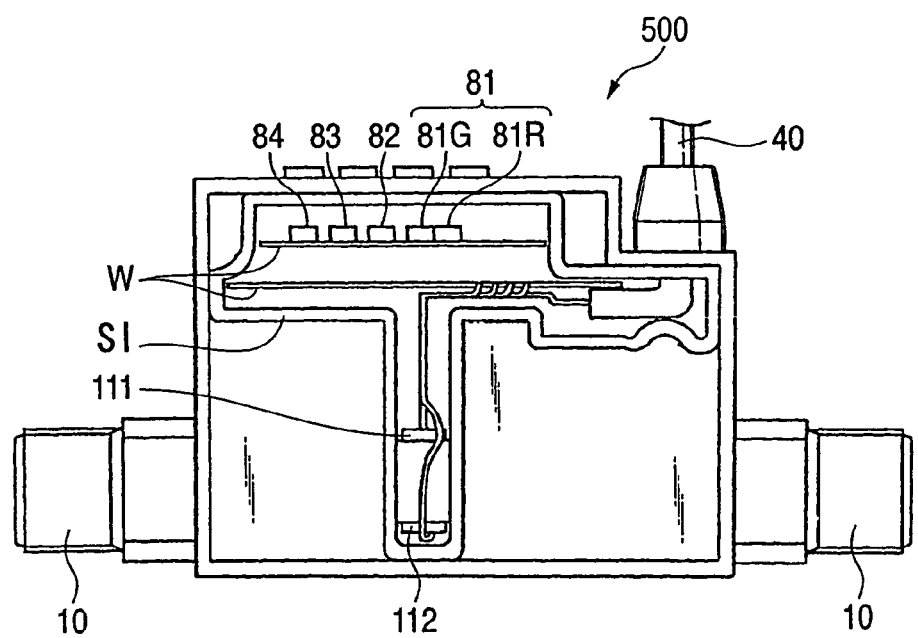
Figure 13:
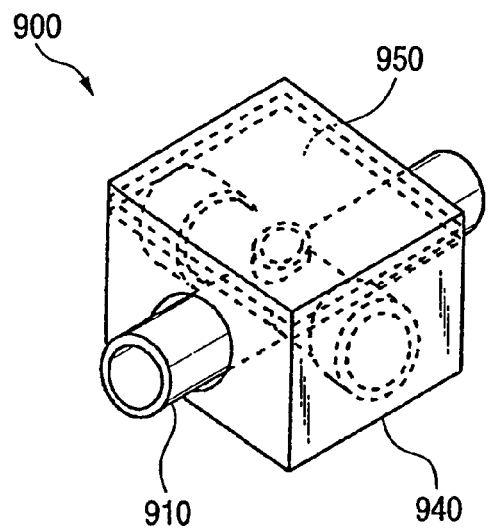
FIG. 13 is an external perspective view of a detection section of a flow sensor in a related art.
Figure 14:
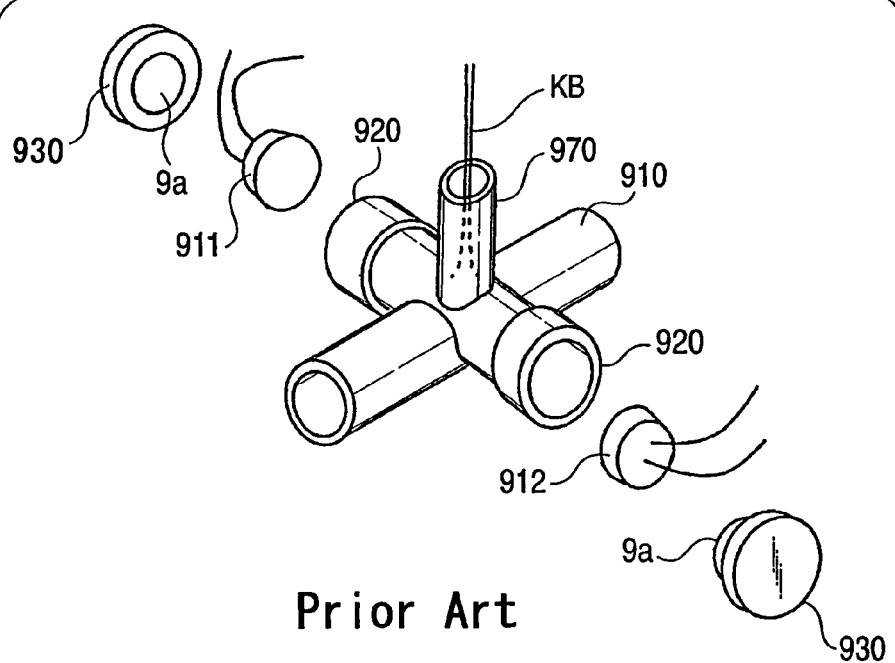
FIG. 14 is an exploded perspective view of the detection section of the flow sensor in the related art.

FIG. 11 is an exploded perspective view of the detection section of the flow sensor according to the second embodiment of the invention. FIG. 12A is a plan view of the detection section of the flow sensor according to the second embodiment of the invention and FIG. 12B is an exploded side view of the detection section of the flow sensor according to the second embodiment of the invention.

In FIG. 11, the detection section 500 is provided with casing members 21, 22, and 23, the through water pipe line 10, two circuit boards W, packing PK, a plurality of screws 50, and a press member 32. The through water pipe line 10 is formed integrally with the casing member 22. The casing members 21, 22, and 23 are combined into the casing 20 in FIG. 10.

The casing member 22 has a circuit/sensor housing area AS in an internal portion. The circuit/sensor housing area AS is surrounded by the upper face 20a of the casing member 22 and a partition plane SI. The two circuit boards W are installed so as to overlap each other in an upper portion of the circuit/sensor housing area AS.

Installed on the circuit boards W are a high frequency signal oscillator 120, a high frequency signal amplifier 130, a phase comparator 140, a low frequency amplifier 150, a comparator 160, a frequency divider 170, a decoder 180, a signal level determination unit 190, and the above-mentioned flow indicator LU.

In a lower portion of the casing member 22, a transmitter 111 and a receiver 112 are attached to the through water pipe line 10 as in the cabinet 30 of the detection section 100 according to the first embodiment. When the transmitter 111 and the receiver 112 are attached to the through water pipe line 10, they are housed in a lower portion of the circuit/sensor housing area AS by the press member 32. The press member 32 is provided with a pair of press parts 32a and 32b and a flat part 32c. The pair of press parts 32a and 32b is formed at both ends of the flat part 32c so as to be opposed to each other.

Four holes are made in the upper face 20a of the casing member 21. Light emission sections 81 to 84 are placed on the circuit boards W in the circuit/sensor housing area AS corresponding to the four holes of the casing member 21.

As shown in FIG. 11, the two circuit boards W are attached and the transmitter 111 and the receiver 112 are attached to the through water pipe line 10 by the press member 32. The casing member 22 is joined to the casing members 21 and 23 by the plurality of screws 50 via the packing PK on a seal face GS. The packing PK is mounted on the seal face GS, whereby the internal space of the circuit/sensor housing area AS is reliably hermetically sealed.

In FIG. 11, the casing members 21, 22, and 23 are attached to each other by the plurality of screws 50 as follows: The screws 50 are screwed through threaded holes a1 to a8 of the casing member 22 into threaded holes C1 to C8 of the casing members 21 and 22, whereby the casing members 21, 22, and 23 are attached to each other.

Thus, the casing members 21, 22, and 23 are attached by the plurality of screws 50, whereby the casing 20 can be easily made waterproof.

In the embodiment, the casing members 21, 22, and 23 may be attached not only by the plurality of screws 50, but also with an adhesive, etc.

The detection section 500 of the flow sensor according to the embodiment can be molded of the same material in one piece and can be easily manufactured and cost reduction is made possible. In the structure of the detection section 500 of the flow sensor according to the embodiment, thickness t of the detection section 500 of the flow sensor in one direction of the detection section 500 (FIG. 12) also lessens. The thickness t is, for example, 22.5 mm.

In the first and second embodiments described above, the flow indicator LU corresponds to the display section, the light emission sections 81 to 84 correspond to the light emission sections, the frequency divider 170 and the decoder 180 correspond to the control section, the transmitter 111 and the receiver 112 correspond to the Karman vortex detection section, and the high frequency signal oscillator 120 corresponds to the pulse generation means. The through water pipe line 10 corresponds to the pipe line, the column PO corresponds to the vortex generation member, the transmitter 111 and the receiver 112 correspond to the pair of ultrasonic devices, the pair of press parts 32*a* and 32*b* corresponds to the pair of press parts, the flat part 32*c* corresponds to the joint part, and the press member 32 corresponds to the press member.

Further, the circuit/sensor housing area AS corresponds to the housing space, the short side of the side face 20*e*, 20*f* of the detection section 100, 500 corresponds to the width of the first length, the thickness t in FIG. 5A and FIG. 12A, the short side of the top face 20*a*, 20*b* of the detection section 100, 500, corresponds to the thickness of the second length, and the cabinet 30 corresponds to the hermetic seal space.

What is claimed is:

1. A flow sensor comprising:
    a sensor head section which comprises:
    a case having six faces, wherein at least two of said faces each include an opening disposed therein,
    a pipe line through which the fluid passes, said pipe line being disposed so as to pass through the opening disposed in each of said at least two of said faces of said case,
    a detector for detecting a flow quantity of the fluid, and
    a flow indicator having a plurality of light emission sections disposed on one of said faces of said case and turning on at least one of said plurality of light emission sections, so as to indicate the flow quantity of the fluid by at least one of a speed of cycling light through said plurality of light emission sections and the number of said plurality of light emission sections emitting light, and
    wherein one of said faces of said case consists of said plurality of light emitting sections of said flow indicator and a planar face whereby the width of said case is minimized by using said plurality of light emitting sections disposed along the longitudinal direction of said pipe line; and
    a sensor main section provided as a separate body from said sensor head section which comprises
    a display section for displaying a value of the flow quantity as a numeric value, and
    an output section for outputting a signal based on the value of the flow quantity.

2. The flow sensor as claimed in claim 1, wherein said sensor head section further comprises a vortex generation member provided in said pipe line for generating a Karman vortex, and wherein said detector includes a pair of ultrasonic devices attached on an outer peripheral surface of said pipe line along a perpendicular direction of said face on which said flow indicator is disposed so that said pipe line is located between said ultrasonic devices.

3. The flow sensor as claimed in claim 2, wherein said sensor head section further comprises a press member having a pair of press parts for pressing said pair of ultrasonic devices against said pipe line and a joint part for joining said pair of press parts.

4. The flow sensor as claimed in claim 2, wherein said case includes a housing space for housing a circuit board disposed adjacent to one of the ultrasonic devices in the perpendicular direction of said face on which said flow indicator is disposed.

5. The flow sensor as claimed in claim 4, wherein said case includes a hermetic seal for hermetically sealing said pair of ultrasonic devices and a part of said pipe line.

6. The flow sensor as claimed in claim 5, wherein said housing space and a space receiving said hermetic seal are connected to each other.

7. The flow sensor as claimed in claim 1, wherein said sensor head section further comprises an alarm detector for detecting at least one of whether the fluid is filled in said pipe line and whether there is a bubble in the fluid, an alarm output portion for outputting an alarm signal based on a detection of said alarm detector, and wherein said flow indicator of said sensor head section displays an alarm based on the alarm signal outputted by said alarm output portion.

8. The flow sensor as claimed in claim 1, wherein said sensor head section further comprises an alarm detector for detecting at least one of whether the fluid is filled in said pipe line and whether there is a bubble in the fluid, and an alarm output portion for outputting an alarm signal based on the detection of said alarm detector, and wherein said display section of said sensor main section displays an alarm based on the alarm signal outputted by said alarm output portion.

9. The flow sensor as claimed in claim 8, wherein when said alarm output portion outputs the alarm signal, said display section of said sensor main section displays the value of the flow quantity.

10. The flow sensor as claimed in claim 9, further comprising: a compute section for computing the value of the flow quantity based on the flow quantity of the fluid, and said compute section performing different processing when the alarm signal is on.

11. A flow sensor comprising:
    a sensor head section which comprises:
    a case having six faces, wherein at least two of said faces each include an opening disposed therein,
    a pipe line through which the fluid passes, said pipe line being disposed so as to pass through the opening disposed in each of said at least two of said faces of said case,
    a detector for detecting a flow quantity of the fluid, and
    a flow indicator having a plurality of light emission sections disposed on one of said faces of said case and turning on at least one of said plurality of light emission sections by at least one of a decoder and a signal level determination unit, so as to indicate the flow quantity of the fluid by at least one of a speed of cycling light through said plurality of light emission sections and the number of said plurality of light emission sections emitting light, and
    wherein one of said faces of said case consists of said plurality of light emitting sections of said flow indicator and a planar face whereby the width of said case is minimized by using said plurality of light emitting sections disposed along the longitudinal direction of said pipe line; and
    a sensor main section provided as a separate body from said sensor head section which comprises
    a display section for displaying a value of the flow quantity as a numeric value, and an output section for outputting a signal based on the value of the flow quantity.

12. The flow sensor as claimed in claim 11, wherein said sensor head section further comprises a vortex generation member provided in said pipe line for generating a Karman vortex, and wherein said detector includes a pair of ultrasonic devices attached on an outer peripheral surface of said pipe line along a perpendicular direction of said face on which said flow indicator is disposed so that said pipe line is located between said ultrasonic devices.

13. The flow sensor as claimed in claim 12, wherein said sensor head section further comprises a press member having a pair of press parts for pressing said pair of ultrasonic devices against said pipe line and a joint part for joining said pair of press parts.

14. The flow sensor as claimed in claim 12, wherein said case includes a housing space for housing a circuit board disposed adjacent to one of the ultrasonic devices in the perpendicular direction of said face on which said flow indicator is disposed.

15. The flow sensor as claimed in claim 14, wherein said case includes a hermetic seal for hermetically sealing said pair of ultrasonic devices and a part of said pipe line.

16. The flow sensor as claimed in claim 15, wherein said housing space and a space receiving said hermetic seal are connected to each other.

17. The flow sensor as claimed in claim 11, wherein said sensor head section further comprises an alarm detector for detecting at least one of whether the fluid is filled in said pipe line and whether there is a bubble in the fluid, an alarm output portion for outputting an alarm signal based on a detection of said alarm detector, and wherein said flow indicator of said sensor head section displays an alarm based on the alarm signal outputted by said alarm output portion.

18. The flow sensor as claimed in claim 11, wherein said sensor head section further comprises an alarm detector for detecting at least one of whether the fluid is filled in said pipe line and whether there is a bubble in the fluid, and an alarm output portion for outputting an alarm signal based on the detection of said alarm detector, and wherein said display section of said sensor main section displays an alarm based on the alarm signal outputted by said alarm output portion.

19. The flow sensor as claimed in claim 18, wherein when said alarm output portion outputs the alarm signal, said display section of said sensor main section displays the value of the flow quantity.

20. The flow sensor as claimed in claim 19, further comprising: a compute section for computing the value of the flow quantity based on the flow quantity of the fluid, and said compute section performing different processing when the alarm signal is on.

* * * * *